US011879729B2

(12) United States Patent
Ausserlechner

(10) Patent No.: US 11,879,729 B2
(45) Date of Patent: Jan. 23, 2024

(54) MEASUREMENT ARRANGEMENT AND SENSOR PACKAGE

(71) Applicant: Infineon Technologies AG, Neubiberg (DE)

(72) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 443 days.

(21) Appl. No.: 17/062,886

(22) Filed: Oct. 5, 2020

(65) Prior Publication Data

US 2021/0116231 A1 Apr. 22, 2021

(30) Foreign Application Priority Data

Oct. 16, 2019 (DE) .......................... 102019215947.8

(51) Int. Cl.
*G01B 7/30* (2006.01)
*G01D 5/14* (2006.01)
*G01D 5/16* (2006.01)

(52) U.S. Cl.
CPC ............... *G01B 7/30* (2013.01); *G01D 5/145* (2013.01); *G01D 5/16* (2013.01)

(58) Field of Classification Search
CPC ............ G01B 7/30; G01B 7/145; H01L 43/06
See application file for complete search history.

(56) References Cited

U.S. PATENT DOCUMENTS

| 6,275,025 | B1 | 8/2001 | Wiese |
| 7,560,919 | B2 | 7/2009 | Hatanaka et al. |
| 9,267,781 | B2 | 2/2016 | Ausserlechner |
| 9,915,552 | B2* | 3/2018 | Ausserlechner ....... G01D 5/145 |
| 10,416,001 | B2 | 9/2019 | Ausserlechner |
| 10,545,198 | B2 | 1/2020 | Takaki et al. |
| 10,928,221 | B2* | 2/2021 | Ausserlechner ......... G01D 5/04 |
| 2018/0172423 | A1 | 6/2018 | Ausserlechner |
| 2021/0063135 | A1* | 3/2021 | Antoku ..................... G01B 7/30 |

FOREIGN PATENT DOCUMENTS

| CN | 102650683 A | 8/2012 |
| CN | 102954807 A | 3/2013 |
| CN | 103630150 A | 3/2014 |
| CN | 104655004 A | 5/2015 |
| CN | 104656043 A | 5/2015 |
| DE | 10261612 A1 | 12/2003 |
| DE | 10314602 A1 | 10/2004 |

(Continued)

*Primary Examiner* — Reena Aurora

(74) *Attorney, Agent, or Firm* — Harrity & Harrity, LLP

(57) ABSTRACT

A measurement arrangement includes a first soft magnetic element, a second soft magnetic element, a magnetic element which is mechanically coupled to the first soft magnetic element and is configured to produce a magnetic field, and a sensor arrangement for capturing the magnetic field, which sensor arrangement is arranged in such a manner that a relative movement between the first soft magnetic element and the sensor arrangement results in a change in the magnetic field at the location of the sensor arrangement. The sensor arrangement is configured to determine the change. The sensor arrangement and the magnetic element are arranged between the first soft magnetic element and the second soft magnetic element.

26 Claims, 12 Drawing Sheets

(56) References Cited

FOREIGN PATENT DOCUMENTS

| | | |
|---|---|---|
| DE | 102006000492 A1 | 5/2007 |
| DE | 102007032299 A1 | 1/2009 |
| DE | 102009054892 A1 | 7/2010 |
| DE | 102014116842 A1 | 6/2015 |
| DE | 112015005195 T5 | 8/2017 |
| DE | 102016124952 A1 | 6/2018 |
| DE | 102018120604 A1 | 4/2019 |

* cited by examiner

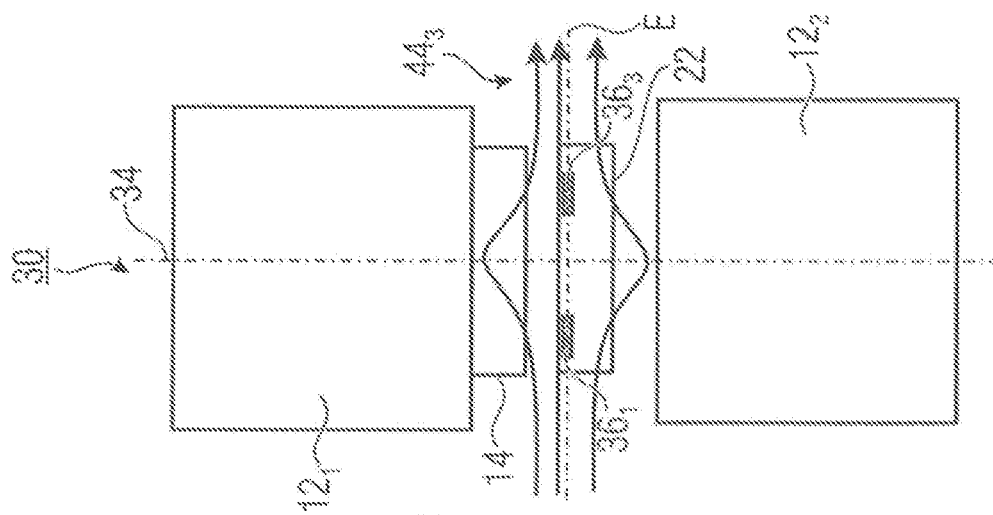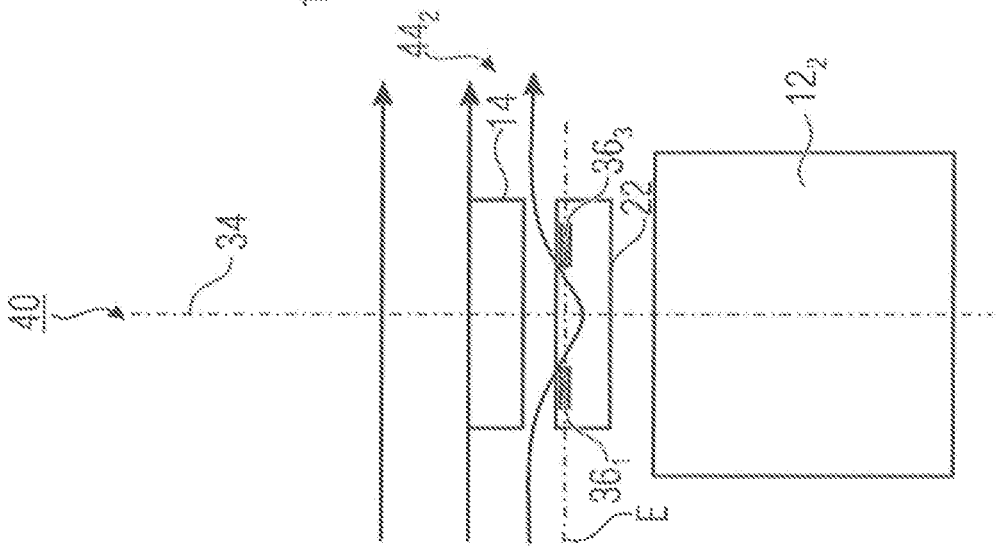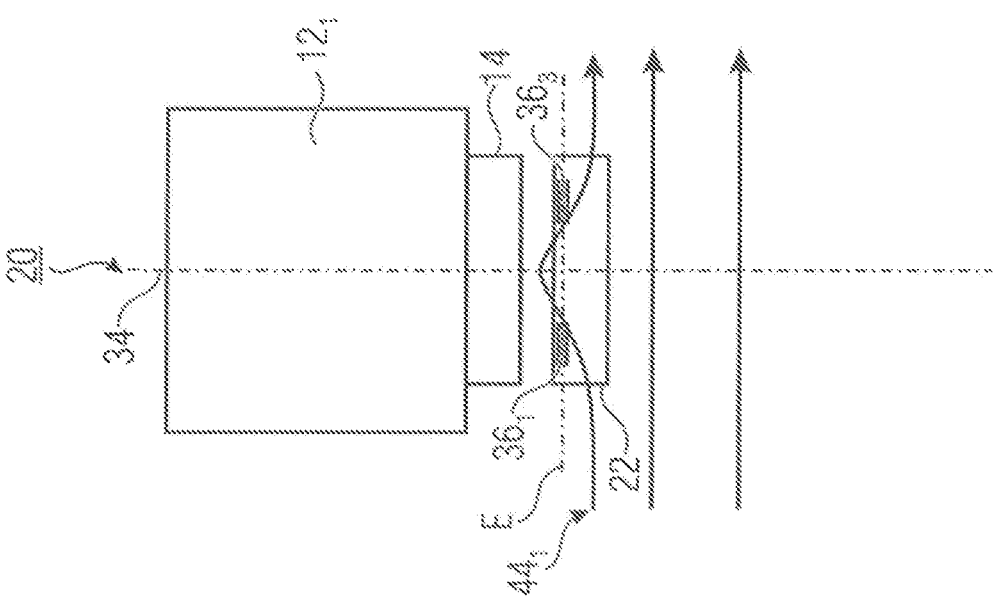

MEASUREMENT ARRANGEMENT AND SENSOR PACKAGE

RELATED APPLICATION

This application claims priority to German Patent Application No. 102019215947.8, filed on Oct. 16, 2019, which is incorporated herein by reference in its entirety.

FIELD

The present disclosure relates to a measurement arrangement, in particular for capturing a relative position of a soft magnetic element with respect to a sensor arrangement, to a sensor package having a sensor arrangement and a soft magnetic element, to a method for capturing a relative position of a soft magnetic element, to a method for providing a measurement arrangement, and to a method for producing a sensor arrangement. The present disclosure also relates to an angle sensor that is robust with respect to stray fields and has Hall plates for systems with a ferrous shaft, and to magnetic angle sensors.

BACKGROUND

Magnetic angle sensors comprise a magnet that produces a magnetic field. A rotation based on a sensor arrangement having four sensor elements, for instance Hall sensors, results in a paired measurement, for instance A-C and B-D, with A, B, C and D as Hall sensors. The system can calculate the angle on the basis of an arc tangent function, for example ARCTAN (A-C)/(B-D). Such systems make it possible for homogeneous interference to be compensated for by calculating the differences A-C and B-D, which is also referred to as a gradiometric measurement principle.

A measurement arrangement, a sensor package and methods for capturing a relative position of a soft magnetic element, a method for providing a measurement arrangement and a method for producing a sensor arrangement which enable a reliable measurement even when soft magnetic materials are used would be desirable.

SUMMARY

Exemplary embodiments provide a measurement arrangement having a first soft magnetic element and a second soft magnetic element. The measurement arrangement includes a magnetic element which is mechanically coupled to the first soft magnetic element and is designed to produce a magnetic field. The measurement arrangement also includes a sensor arrangement for capturing the magnetic field, which sensor arrangement is arranged in such a manner that a relative movement between the first soft magnetic element and the sensor arrangement results in a change in the magnetic field at the location of the sensor arrangement, wherein the sensor arrangement is designed to determine the change. The sensor arrangement and the magnetic element are arranged between the first soft magnetic element and the second soft magnetic element.

According to one exemplary embodiment, a sensor package includes a sensor arrangement for capturing an external magnetic field, wherein sensor elements of the sensor arrangement are arranged in a plane. The sensor arrangement has a geometric center of gravity in the plane. The sensor package includes a soft magnetic element which is formed in a rotationally symmetrical manner about an element axis of symmetry, wherein the geometric center is arranged along the element axis of symmetry.

According to one exemplary embodiment, a method for capturing a relative position of a first soft magnetic element includes capturing a magnetic field, which changes with the relative position of the first soft magnetic element at the location of the sensor device, using the sensor device. The method also includes influencing the magnetic field at the location of the sensor arrangement in a symmetrical manner with respect to the first soft magnetic element and based on the sensor arrangement by means of a second soft magnetic element.

According to one exemplary embodiment, a method for providing a measurement arrangement includes arranging a first soft magnetic element and a sensor arrangement, with the result that a relative position with respect to one another is variable based on a relative movement. The method includes arranging a magnetic element in order to produce a magnetic field which is variable at the location of the sensor arrangement based on the relative movement. The method also includes arranging a second soft magnetic element, with the result that the sensor arrangement and the magnetic element are arranged between the first soft magnetic element and the second soft magnetic element.

According to one exemplary embodiment, a method for producing a sensor arrangement includes arranging a multiplicity of sensor arrangements on a first main side of a wafer, with the result that each sensor arrangement of the multiplicity of sensor arrangements has a plurality of sensor elements. The method includes arranging a number of soft magnetic elements corresponding to the multiplicity of sensor arrangements on a second main side of the wafer, with the result that a soft magnetic element is respectively opposite a sensor arrangement. The method includes separating the multiplicity of sensor arrangements after arranging the multiplicity of sensor arrangements. Further exemplary embodiments are defined in the dependent patent claims.

BRIEF DESCRIPTION OF THE DRAWINGS

Exemplary embodiments are explained below with reference to the accompanying drawings, in which:

FIG. 4a shows a schematic sectional side view for explaining an influence on a magnetic field in the measurement arrangement according to FIG. 2;

FIG. 4b shows a schematic sectional side view for explaining an influence on a magnetic field in an incomplete measurement arrangement according to one exemplary embodiment in which the additional soft magnetic element from FIG. 3 is arranged;

FIG. 4c shows a schematic sectional side view for explaining a combined influence on a magnetic field from FIG. 4a and FIG. 4b;

FIG. 6b shows a schematic sectional side view of the package from FIG. 6a;

DETAILED DESCRIPTION

Before exemplary embodiments of the present invention are explained more specifically in detail below using the drawings, it is pointed out that identical, functionally identical or identically acting elements, objects and/or structures in the different figures are provided with the same reference signs, with the result that the description of these elements which is presented in different exemplary embodiments is interchangeable or can be applied to one another.

Exemplary embodiments relate to gradiometric angle sensors or gradiometers. Unlike non-gradiometric angle sensors, as described, for instance, in "Inaccuracies of giant magneto-resistive angle sensors due to assembly tolerances" (Ausserlechner, U., IEEE Transactions on Magnetics, 45(5), 2165-2174, 2009), gradiometers make it possible to consider gradients of the magnetic field and are described, for example, in "Contactless angle measurement using four Hall devices on single chip" (Metz, M., Haberli, A., Schneider, M., Steiner, R., Maier, C., & Baltes, H., Proceedings of International Solid States Sensors and Actuators Conference (Transducers '97) (Vol. 1, pp. 385-388) IEEE, June 1997) or "A theory of magnetic angle sensors with hall plates and without fluxguides" (Ausserlechner, U. in Progress in Electromagnetics Research, 49, 77-106, 2013).

Figure 1:
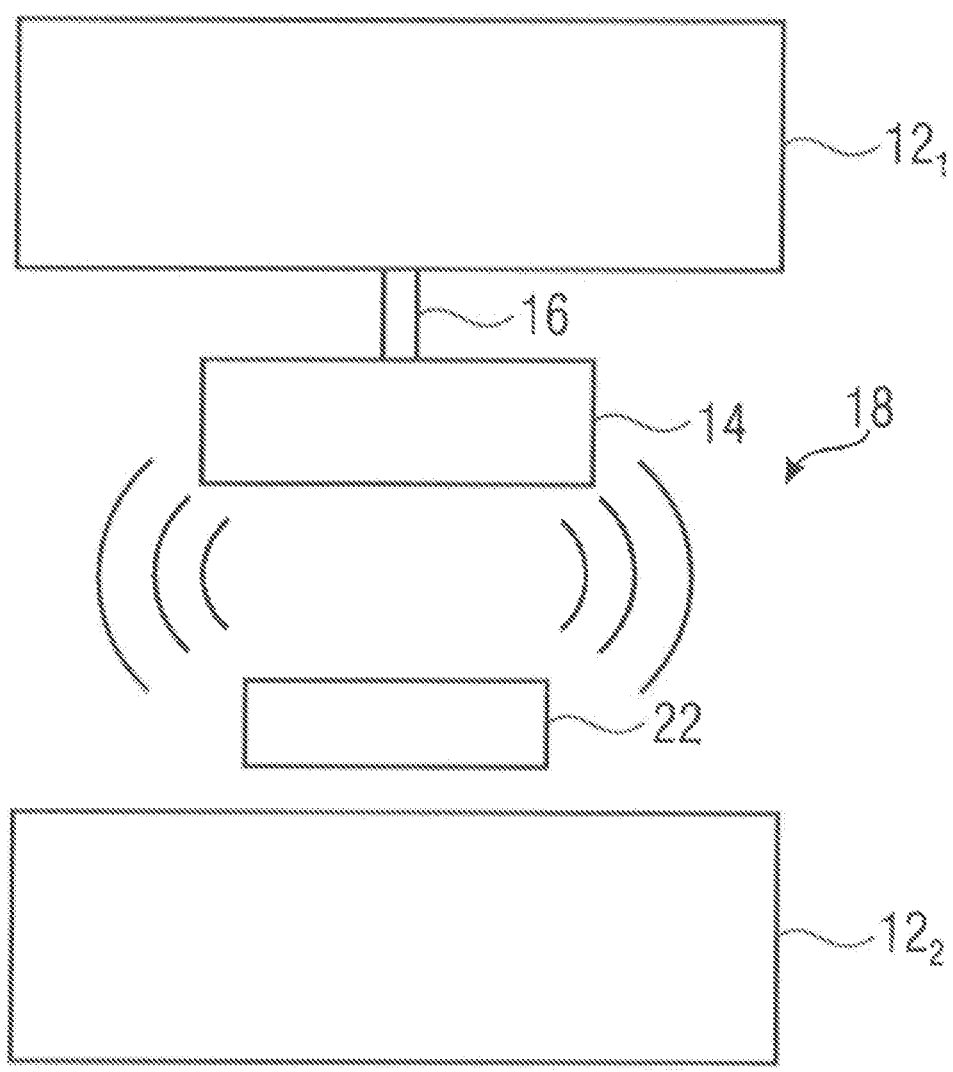
FIG. 1 shows a schematic block diagram of a measurement arrangement according to one exemplary embodiment.

FIG. 1 shows a schematic block diagram of a measurement arrangement 10 according to one exemplary embodiment. The measurement arrangement 10 comprises a soft magnetic element $12_1$, that is to say an element which is formed entirely or partially from soft magnetic material or comprises the latter.

In connection with present exemplary embodiments, soft magnetic is understood as meaning a material having a relative permeability μr of at least 100, at least 1000 or at least 10,000. Whereas a comparatively lower $\mu_x$ makes it possible to compensate for even larger cases, a comparatively high $\mu_r$ can enable rapid saturation. A soft magnetic material is understood as meaning, for example, materials which can be easily magnetized in a magnetic field. Examples are iron, steels with a low carbon content, steels with added silicon and other types of steel. Alternatively, or additionally, the soft magnetic element may comprise a nickel-iron alloy, a cobalt-iron alloy or other alloys, for instance FeAl or FeAlSi or ferrites.

The measurement arrangement 10 also comprises a magnetic element 14 which is mechanically coupled to the soft magnetic element $12_1$. A connecting element 16 which results in a mechanically fixed connection between the magnetic element 14 and the soft magnetic element $12_1$ can be arranged for this purpose. Alternatively, the magnetic element 14 may also be directly connected to the soft magnetic element $12_1$ and/or may be arranged by means of an adhesive layer or other fastenings. The magnetic element 14 may comprise a permanent magnet or may be formed as a permanent magnet, for example. Alternatively, or additionally, it is likewise conceivable for the magnetic element 14 to be designed to produce a magnetic field 18 based on electromagnetism.

The measurement arrangement 10 comprises a sensor arrangement 22 which is designed to capture the magnetic field 18. The sensor arrangement 22 is arranged in this case in such a manner that a relative movement between the soft magnetic element $12_1$ and the sensor arrangement 22 results in a change in the magnetic field 18 at the location of the sensor arrangement 22. The sensor arrangement 22 is designed to determine the change in the magnetic field and therefore the relative movement between the soft magnetic element $12_1$ and the sensor arrangement 22.

The measurement arrangement 10 also comprises a further soft magnetic element $12_2$ which is arranged opposite the soft magnetic element $12_1$. As a result, the sensor arrangement 22 is arranged between the soft magnetic element $12_1$ and the soft magnetic element $12_2$. Optionally, the magnetic element 14 may likewise be arranged between the soft magnetic elements $12_1$ and $12_2$, as illustrated in FIG. 1. However, this is not absolutely necessary for the measurements. Although it may be efficient in terms of installation space, it is of little relevance or even insignificant for the measurements where the magnetic element 14 is arranged. Exemplary embodiments provide for the magnetic element to be arranged in the plane of the sensor arrangement 22 and/or in a plane of the magnetic element $12_1$ or $12_2$ or outside this arrangement, which does not contradict a mechanical coupling of the magnetic element 14 to the soft magnetic element $12_1$. However, exemplary embodiments provide for the sensor elements of the sensor arrangement 22 to be arranged in the plane of symmetry between both soft magnetic elements $12_1$ and $12_2$. This means that exemplary embodiments provide for an arrangement of the sensor arrangement 22, magnetic element 14 and soft magnetic element $12_1$ with a lateral offset with respect to one another, whereas other exemplary embodiments provide for an arrangement of these elements and of the soft magnetic element $12_2$ along an axial arrangement, for instance along an axis of rotation 34, about which the soft magnetic element $12_1$ is rotatably mounted.

The soft magnetic elements $12_1$ and/or $12_2$ may be formed as layer structures each with at least one layer. This also includes multilayer embodiments, which also concomitantly includes different soft magnetic materials. It is also possible for one or more layers to be formed from a material other than a soft magnetic material, for example a combination of a soft magnetic layer with a dielectric layer or the like. The combination of different layers also makes it possible to use different soft magnetic materials with different soft magnetic properties. The layers may also be arranged or alternate in one or two dimensions. A layer sequence may thus be arranged on top of one another and/or a concentric arrangement, for instance in the form of rings, possibly in combination with an internal cylinder.

As also stated in detail below, the soft magnetic element $12_1$ can be magnetized by the magnetic field 18, which may result in distortion or influence of the magnetic field 18 at the location of the sensor arrangement 22, with the result that the measurement carried out is falsified there. Arranging the soft magnetic element $12_2$ opposite the soft magnetic element $12_1$ makes it possible to further influence the magnetic field 18 in a manner which completely or partially counteracts the influence or distortion by the soft magnetic element $12_1$. This means that the soft magnetic element $12_2$ may be configured to distort the magnetic field 18 in a manner opposed to a distortion of the magnetic field 18 caused by the soft magnetic element $12_1$.

The sensor arrangement 22 may comprise a plurality or multiplicity of sensor elements which are used to form a difference between corresponding measured values. For this purpose, each sensor element may output a measurement signal which is processed further by an evaluation circuit, for instance an application-specific integrated circuit—ASIC. This means that the measurement arrangement 10 may be a gradiometric measurement arrangement, for example. The measurement arrangement 10 may be formed as a magnetic field gradiometer.

In other words, unlike in systems where the magnet is arranged on an unmagnetic or non-magnetic shaft, for instance made of aluminum, brass, plastic or stainless steel, where the system is robust with respect to impressed magnetic fields, the measurement arrangement 10 can counteract the effect that, in the case of a soft magnetic shaft, for example a ferrous shaft, having a permeability $\mu_r$ of more than 100, the impressed fields magnetize the shaft diametrically, which can result in angle errors.

In yet other words, a basic arrangement of the measurement arrangement 10 may have, for example from the top to the bottom in FIG. 1, the shaft $12_1$, the magnet 14, a clearance or empty space, a sensor chip (sensor arrangement 22), a clearance or empty space and a disk $12_2$. In this case, it can be noted that the Hall elements are arranged between the soft magnetic elements $12_1$ and $12_2$.

Although exemplary embodiments are described in connection with angle detection, the exemplary embodiments are not restricted thereto, but rather enable a lateral movement as an alternative or in addition to a rotational movement. For example, the magnetic element 14 may have an extent which substantially corresponds to a lateral movement path, with the result that the magnetic field changes along the movement path. If the magnet is mounted on an iron wall (soft magnetic element), for example, interference fields may arise. These may be at least partially compensated for by arranging the soft magnetic element $12_2$, for instance in the form of a soft magnetic disk. Instead of a single magnetic element, it is also possible to use a plurality or multiplicity of magnetic elements which are arranged along the movement path, for example. They may be mounted on a common soft magnetic element $12_1$, for example. If a plurality of soft magnetic elements are used to carry or support a plurality of magnetic elements, a corresponding number of soft magnetic elements $12_2$ can be used, for example, with the result that a corresponding individual interfering influence is individually compensated for each magnet. These corresponding soft magnetic elements may be mounted immovably with respect to the soft magnetic elements $12_1$, for example, with the result that the sensor arrangement 22 is movable with respect to the soft magnetic elements $12_2$, for example.

Figure 2:
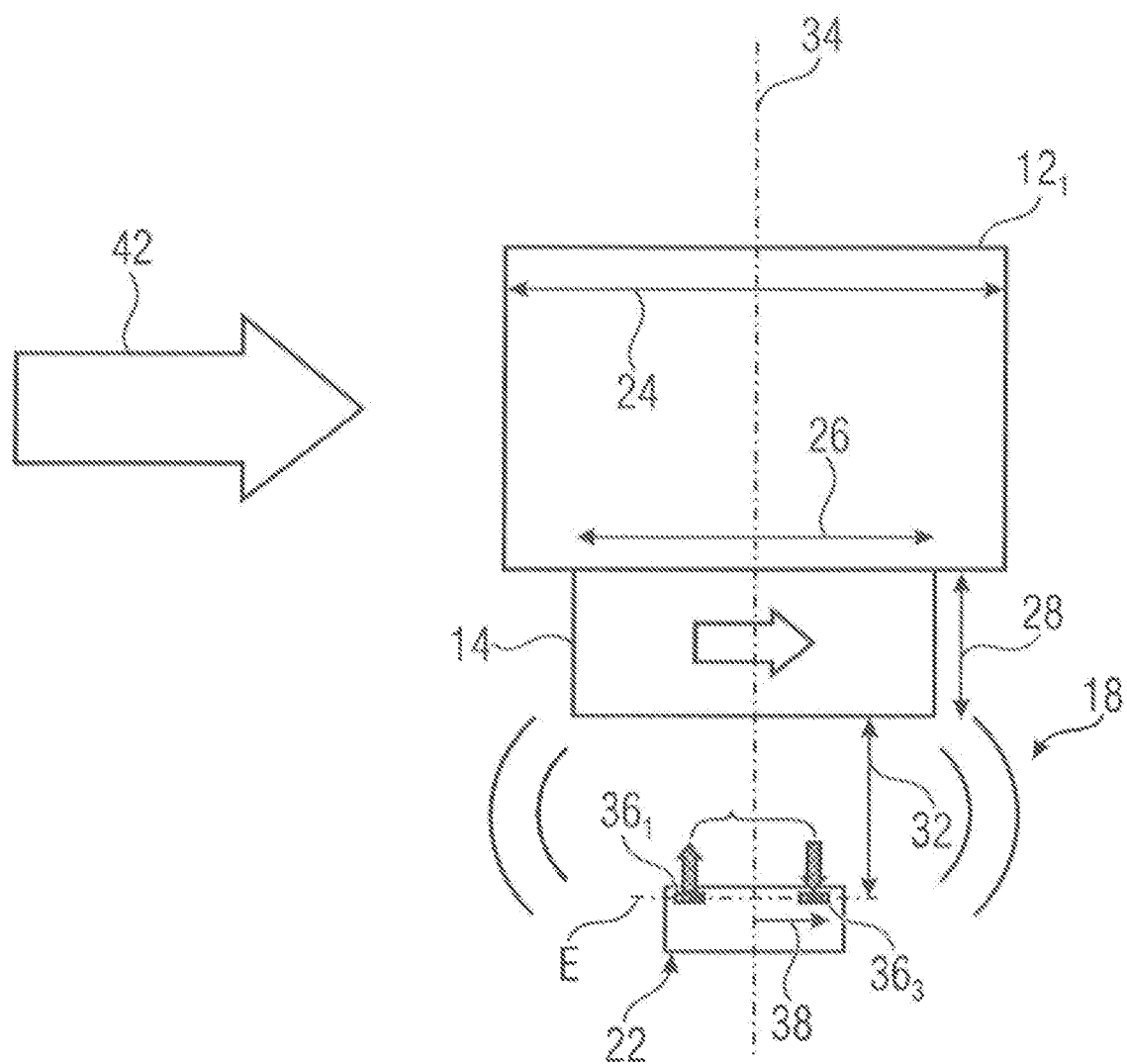
FIG. 2 shows a schematic sectional side view of a known measurement arrangement.

FIG. 2 shows a schematic sectional side view of a known measurement arrangement 20 in which the soft magnetic element $12_1$ has a diameter 24 of 8 mm, for example. The measurement arrangement 20 may be used as a basis for exemplary embodiments which are supplemented by the soft magnetic element $12_2$.

The values stated here should be understood merely as an example in order to illustrate an angle error which has been produced. The soft magnetic element $12_1$ has a permeability $\mu_r$ of 1700, for example. The magnetic element 14 having a diameter 26 of 6 mm is arranged on the soft magnetic element $12_1$, for example. The remanence of the magnetic element 18 has a strength Br of 1100 mT, for example. The magnetic element 14 may be, for example, a samarium-cobalt (SmCo) magnet and may have a thickness 28, that is to say a dimension perpendicular to the diameters 24 and 26, of 2.5 mm, for example.

The sensor arrangement 22 is arranged at a distance 32 from the magnetic element 14, for example along an axis of rotation 34, about which the soft magnetic element $12_1$ is rotationally movable.

The sensor arrangement 22 comprises a plurality of sensor elements $36_1, \ldots, 36_3$ which are arranged at a distance 38, for instance a radius, from the axis of rotation 34. The distance 32 is 2 mm, for example. The distance 38 is 1 mm, for example. Even though only two elements are illustrated and the indexing suggests a number of three sensor elements, a different number of at least three sensor elements may be arranged in exemplary embodiments, for instance at least 4, at least 5 or more, for example 7. According to exemplary embodiments, the sensor elements $36_1$ to $36_3$ may be arranged in a common plane E which may be arranged perpendicular to the axis of rotation 34 and/or parallel to a surface of the magnetic element 14 facing the sensor arrangement 22.

An external interference field 42, which is applied perpendicular to the axis of rotation 34, for example with a strength of 5 mT, may result, in view of the soft magnetic property of the soft magnetic element $12_1$, in magnetization of the element, as a result of which the latter emits its own magnetic field on which the magnetic field 18 is superimposed and which may result in falsification of the measurement results. For example, a measurement difference dBz of the magnetic fields which act on the sensor elements $36_1$ and $36_3$ and are caused by the magnet 14 may be 55.4 mT. At the same time, the external interference which is reflected in the magnetization of the soft magnetic element $12_1$ may make a contribution of 0.664 mT. If the gradiometric principle is applied, an angle error of 0.664/55.4×180°/pi can thus result in the worst case scenario, which corresponds to an angle error of 0.69°, that is to say approximately 0.7°.

The system, that is to say the sensor arrangement and the evaluation device coupled thereto, cannot distinguish between the magnetized shaft $12_1$ and the magnet 14. Said angle error may result therefrom.

This angle error can be counteracted by additionally adding the soft magnetic element $12_2$, as described in connection with FIG. 1. In other words, exemplary embodiments relate to the practice of arranging a soft magnetic disk below the plane E of the Hall plates 36. The soft magnetic element $12_2$ can at least partially compensate for the influence on the shaft $12_1$ by the external interference field 42 by carefully selecting a distance between the Hall plates and the shaft $12_1$ with respect to the thickness and size of the soft magnetic element $12_2$ and a distance between the disk $12_2$ and the Hall plates.

According to one exemplary embodiment, the soft magnetic element $12_2$ is designed, in interaction with the soft magnetic element $12_1$, when an external interference magnetic field which is diametric based on the relative movement, for instance the interference magnetic field 42, acts, to reduce axial components of the interference magnetic field acting on the sensor arrangement by at least 30%, preferably at least 50% or more preferably at least 70%. This relates to a nominal operating state of the measurement arrangement. This denotes a state of the measurement arrangement in which an air gap distance provided for the operation of the apparatus between the magnet 14 and the sensor arrangement 22 is set. As explained in connection with exemplary embodiments, the interference field reduction is particularly effective for a certain sensor-to-magnet distance (sensor arrangement 22-magnetic element 14), with the result that said effect occurs, with which the nominal operating state is described.

Figure 3:
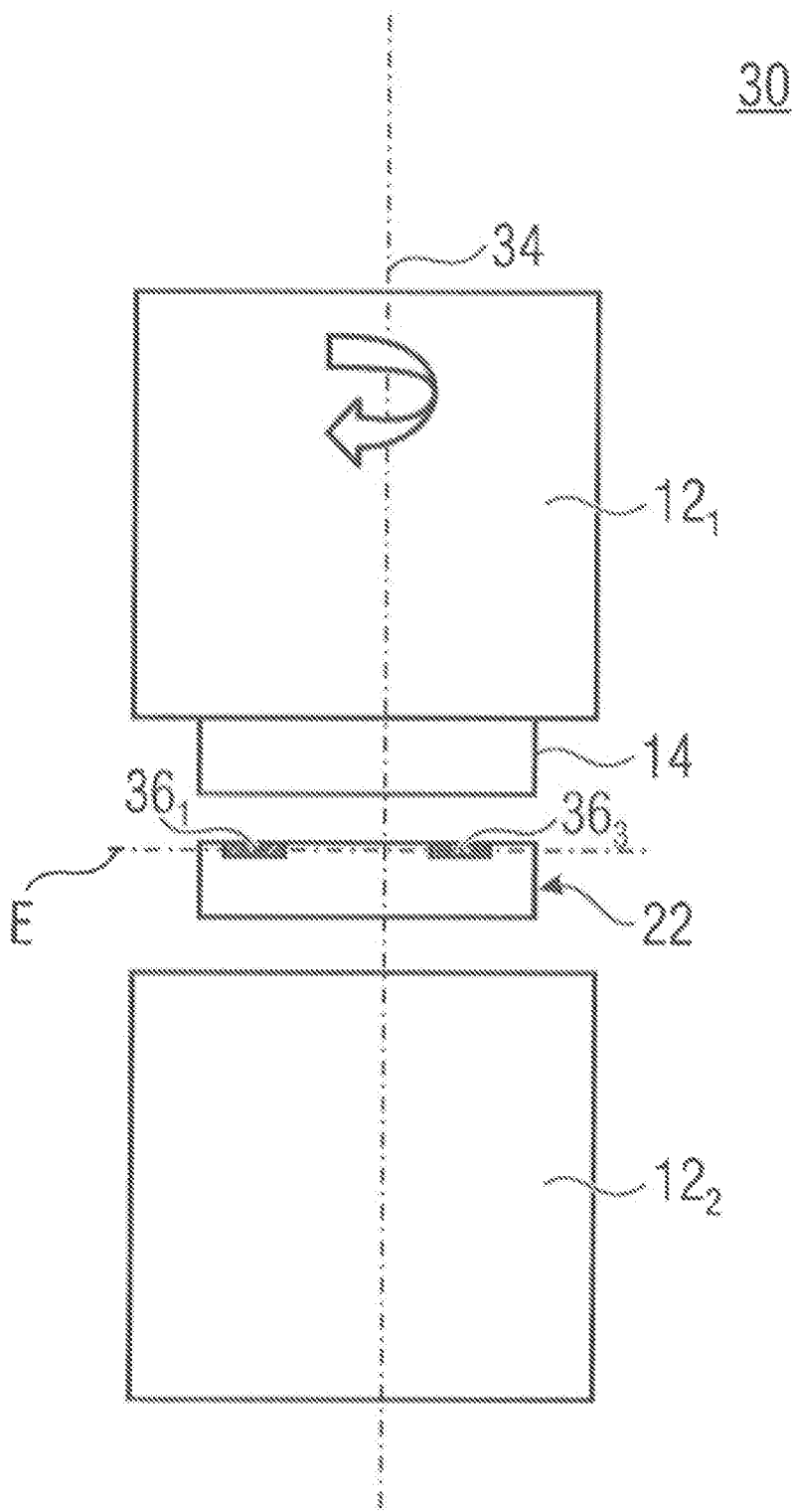
FIG. 3 shows a schematic sectional side view of a measurement arrangement according to one exemplary embodiment which expands the measurement arrangement from FIG. 2 with a soft magnetic element.

FIG. 3 shows a schematic sectional side view of a measurement arrangement 30 according to one exemplary embodiment. The measurement arrangement 30 expands the measurement arrangement 20 with the soft magnetic element $12_2$. The soft magnetic element $12_2$ may be arranged along the axis of rotation 34, with the result that the magnetic field 14 and the sensor arrangement 22 are arranged between the soft magnetic elements $12_1$ and $12_2$. The soft magnetic elements $12_1$ and $12_2$ may be at a constant distance from one another during the relative movement and may also be at a constant distance from the sensor arrangement 22. This means that the influence which is exerted by the soft magnetic elements $12_1$ and $12_2$ on the sensor elements may be substantially independent of a rotational position of the soft magnetic element $12_1$ with respect to the sensor arrangement. According to one exemplary embodiment, the rotational position of the soft magnetic element $12_1$ with respect to the sensor arrangement 22 may be variable, whereas the rotational position of the soft magnetic element $12_2$ with respect to the sensor arrangement 22 is invariable on account of mechanical fixing. Measurement errors can be avoided by configuring the soft magnetic element $12_2$ in a rotationally symmetrical manner. This means that, according to exemplary embodiments, the soft magnetic element $12_2$ may be arranged in a fixed position with respect to the sensor elements, whereas the soft magnetic element $12_2$ may be rotatably arranged with respect thereto. Therefore, exemplary embodiments provide for the lower structure $12_2$ to preferably be configured to be rotationally symmetrical with respect to this rotational movement. Alternatively, or additionally, the soft magnetic element $12_2$ may be formed or consist of a material with low coercivity, for instance pure iron or nickel or Mumetal or permalloy.

The sensor elements 36 may be formed, for example, as Hall sensors or Hall plates. Alternatively, the sensor elements 36 may be formed as magnetoresistive sensors, for example AMR sensors (anisotropic magnetoresistive effect), GMR sensors (giant magnetoresistance) or others. The sensor elements may be formed as a magnetic angle sensor. Measurement arrangements according to exemplary embodiments may be designed to evaluate the sensor elements 36 using the gradiometric principle, that is to say by forming pairs of differences of the same magnetic field components at different locations. For this purpose, the measurement arrangement may have an evaluation circuit which is configured to receive measurement signals from the sensor elements, wherein each measurement signal may be a representation of the magnetic field captured by the respective sensor element $36_i$. This means that, for example, the x component of the magnetic field can be measured at the location 1 (location of a first sensor element) and at the location 2 (location of a second sensor element) and can be subtracted: $B_x(1)-B_x(2)$ or $B_x(2)-B_x(1)$.

FIGS. 4a, 4b and 4c are used to explain, by way of example, how the arrangement of the soft magnetic element $12_2$ contributes to compensating for the inaccuracies caused by the soft magnetic element $12_1$. Although the magnet 14 is depicted in the figures, it can be assumed to be non-magnetic or not yet magnetized for the following explanations.

FIG. 4a again shows a schematic sectional side view of the measurement arrangement 20. For example, an external interference magnetic field is superimposed on the magnetic field 18. Whereas the magnetic field 18 can be considered to be a useful field, the interference field is an additional component which is superimposed on the magnetic field 18. The entire field can be captured by the sensor arrangement. As a result of the soft magnetic property of the soft magnetic element $12_1$, the entire magnetic field experiences interference or influence $44_1$ by virtue of the external interference magnetic field and based on the magnetization of the soft magnetic element $12_1$, which interference or influence can have an effect at the location of the sensor elements 36. In other words, the interference field causes a distortion $44_1$.

In other words, FIG. 4a shows the influence of the soft magnetic element $12_1$ without the reflective shaft $12_2$ and without the magnet 14.

FIG. 4b shows a schematic sectional side view of an incomplete measurement arrangement 40 in which the soft magnetic element $12_1$ has been removed for the purposes of explanation, with the result that only the influences of the sensor arrangement 20 and of the soft magnetic element $12_2$ are taken into account. In this case too, the distortion $44_2$ can be obtained or at least partially caused by the interference field.

The soft magnetic element $12_2$ may likewise be magnetized by the magnetic element 14, with the result that the interference field causes influence or interference or distortion $44_2$ by the soft magnetic element $12_2$, which can likewise have an effect at the location of the sensor elements 36.

In other words, FIG. 4b shows the influence of the soft magnetic element $12_2$ without the original shaft $12_1$.

FIG. 4c shows a schematic sectional side view of the measurement arrangement 30 and a schematic illustration of interference or influence 443 of the magnetic field. Since the influence $44_2$ from FIG. 4b is opposed to the influence $44_1$ from FIG. 4a, the interference or influences can be partially or completely compensated for at the location of the sensor elements.

A changed magnetic field is produced by the at least two magnetic fields (magnetic field 18, useful field, on the one hand, and interference field, on the other hand). It may be difficult or impossible for the sensor arrangement 22 to distinguish between these fields, with the result that it measures the sum of both fields, for example. Arranging the soft magnetic element $12_2$ makes it possible to cause a distortion which is opposed based on the soft magnetic element $12_1$ and in turn "straightens" the distortion of the interference magnetic field at the element $12_1$. The soft magnetic element $12_2$ may be configured to cause the distortion $44_2$ of an interference field superimposed on the magnetic field, which distortion is opposed to a distortion $44_1$ of the interference field which is caused by the soft magnetic element $12_1$.

Figure 8:
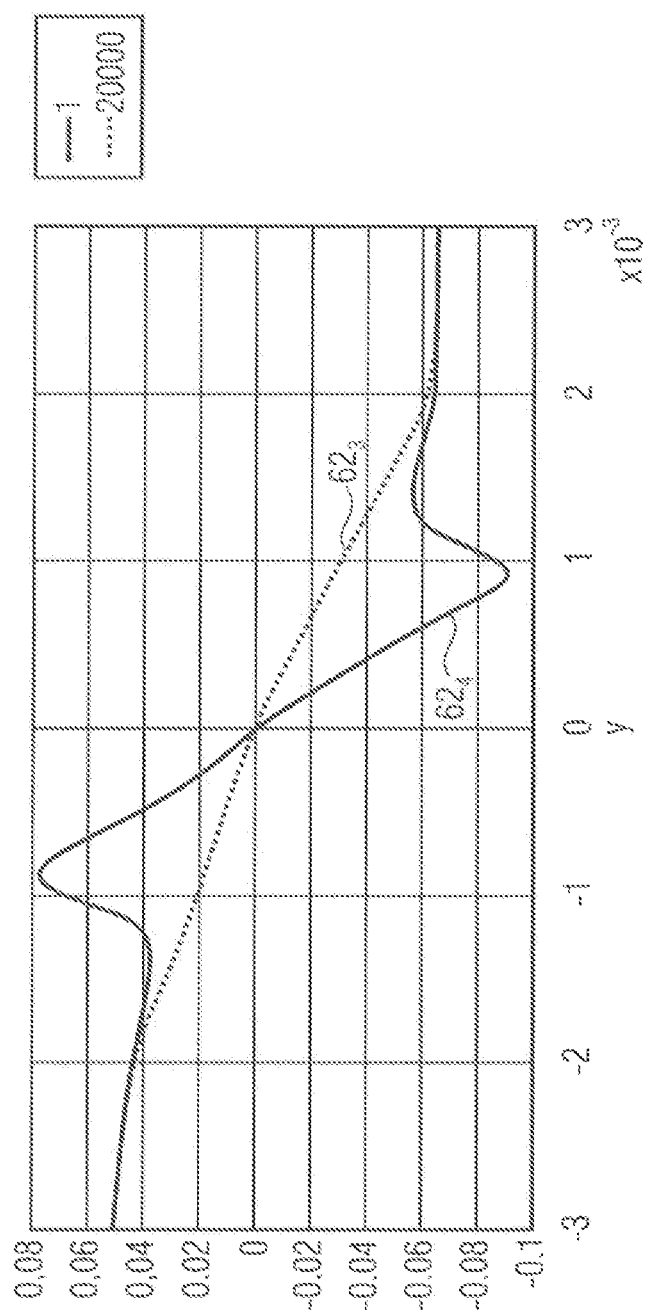
FIG. 8 shows a schematic graph of the setup from FIG. 7, wherein the measured values are plotted along the y direction.

In other words, the additional soft magnetic structure $12_2$ can provide the property whereby it straightens/homogenizes the interference magnetic field again which has been bent/become inhomogeneous by the shaft $12_1$. This may result in the additional soft magnetic structure $12_2$ also changing the useful magnetic field of the magnet, but this can be approvingly accepted since the influence, as shown in FIG. 8, can be moderate, for example approximately 13%.

For a high degree of compensation for the interfering influence $44_1$, a symmetrical continuation of the soft magnetic element $12_1$ or of the effects caused thereby based on the sensor elements 36 can thus be obtained. This means that, for example in the case of a relative rotational movement of the soft magnetic element $12_1$ about the axis of rotation 34, the influence $44_2$ of the magnetic field by the soft magnetic property of the soft magnetic element $12_2$ can continue the influence $44_1$ of the magnetic field by the soft magnetic property of the soft magnetic element $12_1$ in a symmetrical manner with respect to the sensor arrangement 22 along the axis of rotation 34.

In order to obtain a symmetrical continuation, different parameters can be varied, for example a size (dimension along the axis of rotation 34 and/or perpendicular thereto and/or a distance between the soft magnetic element $12_2$ and the plane E). Reducing the distance makes it possible to use a comparatively small soft magnetic element $12_2$, with the result that even small soft magnetic elements $12_2$ are suitable for achieving a high degree of compensation for the influence $44_1$. For example, the soft magnetic element $12_2$ may be arranged at a shorter distance from the sensor arrangement 22 or the plane E than the soft magnetic element $12_1$. Alternatively, or additionally, a diameter of the soft magnetic element $12_1$ may be greater than a diameter of the soft magnetic element $12_2$. In this case, the diameter relates to a circular or rotationally symmetrical configuration of the soft magnetic elements $12_1$ and $12_2$ and is arranged parallel to the plane E in space. The rotational symmetry also makes it possible to avoid angle errors caused by the soft magnetic element $12_2$ itself.

In other words, FIG. 4c shows the compensation for the shaft $12_1$ by means of the shaft $12_2$. Compensation can be carried out in such a manner that the interference field does not have a component or has only a slight component in the vertical direction, that is to say parallel to the plane E or in the plane E.

Figure 5:
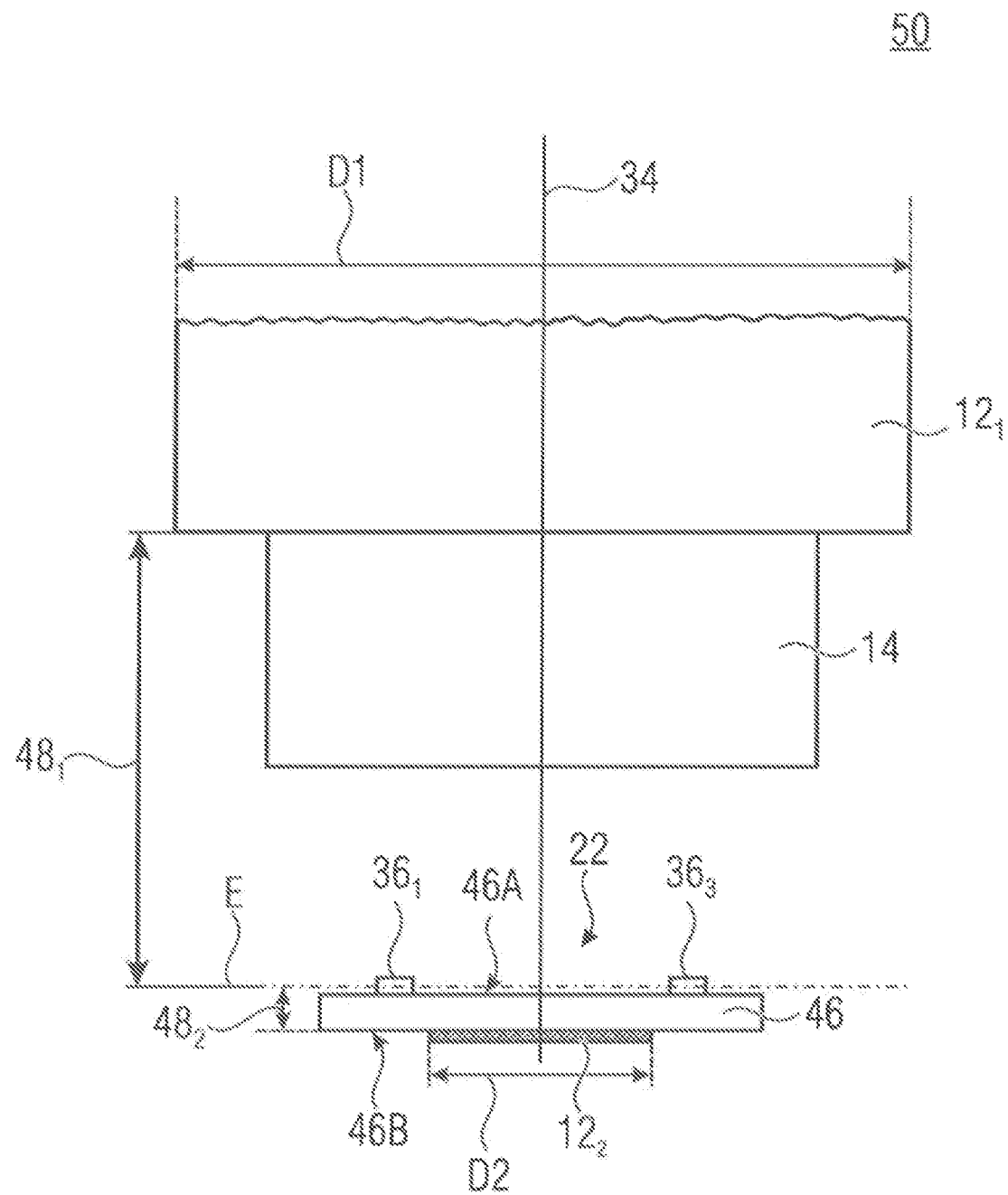
FIG. 5 shows a schematic sectional side view of a measurement arrangement according to one exemplary embodiment in which the additional soft magnetic element is arranged on a substrate of a sensor arrangement.

FIG. 5 shows a schematic sectional side view of a measurement arrangement 50 according to one exemplary embodiment in which the soft magnetic element $12_2$ is arranged on a substrate 46 of the sensor arrangement 22. For example, the sensor elements 36 are arranged on a main side 46A of the substrate 46 which is arranged facing the soft magnetic element $12_1$ and the magnetic element 14. The soft magnetic element $12_2$ may be arranged on an opposite main side 46B and may therefore be arranged on a side of the substrate 46 facing away from the magnetic element 14.

As a result, a distance $48_2$ between the soft magnetic element $12_2$ and the sensor elements 36 may be considerably shorter than a distance $48_1$ between the soft magnetic element $12_1$ and the sensor elements 36. As a result of the shorter distance $48_2$ in comparison with the distance $48_1$, it is possible to configure the soft magnetic element $12_2$ with a smaller diameter $D_2$ than a diameter $D_1$ of the soft magnetic element $12_1$ and/or with a short extent or small thickness parallel to the axis of rotation 34.

This also makes it possible to arrange the soft magnetic element $12_2$ together with the sensor arrangement 22 in a common package, possibly together with an evaluation circuit.

Exemplary embodiments can be implemented in a multiplicity of configurations. The reflective shaft $12_2$ may be in the form of a disk or a ring. It is possible to configure the soft magnetic element $12_2$ to be smaller than the soft magnetic element $12_1$ and to place it closer to the sensor elements for this reason. The soft magnetic element $12_2$ may be arranged outside a sensor package, for example on an underside (facing away from the shaft $12_1$ to be measured) or on an underside of a substrate or circuit board of the sensor arrangement 22. Alternatively, the soft magnetic element $12_2$ may also be arranged inside the sensor package, for example on an underside of a chip carrier or on an underside of the chip of the sensor arrangement. Arranging the soft magnetic element $12_2$ inside the package makes it possible to exactly center the soft magnetic element $12_2$ with respect to the sensor elements of the sensor arrangement 22 which are subsequently arranged as symmetrically as possible with respect to the axis of rotation 34. In addition, the arrangement inside the sensor package enables an even shorter distance between the sensor elements and the soft magnetic element $12_2$, with the result that the size of the soft magnetic element $12_2$ can be reduced further.

Figure 6A:
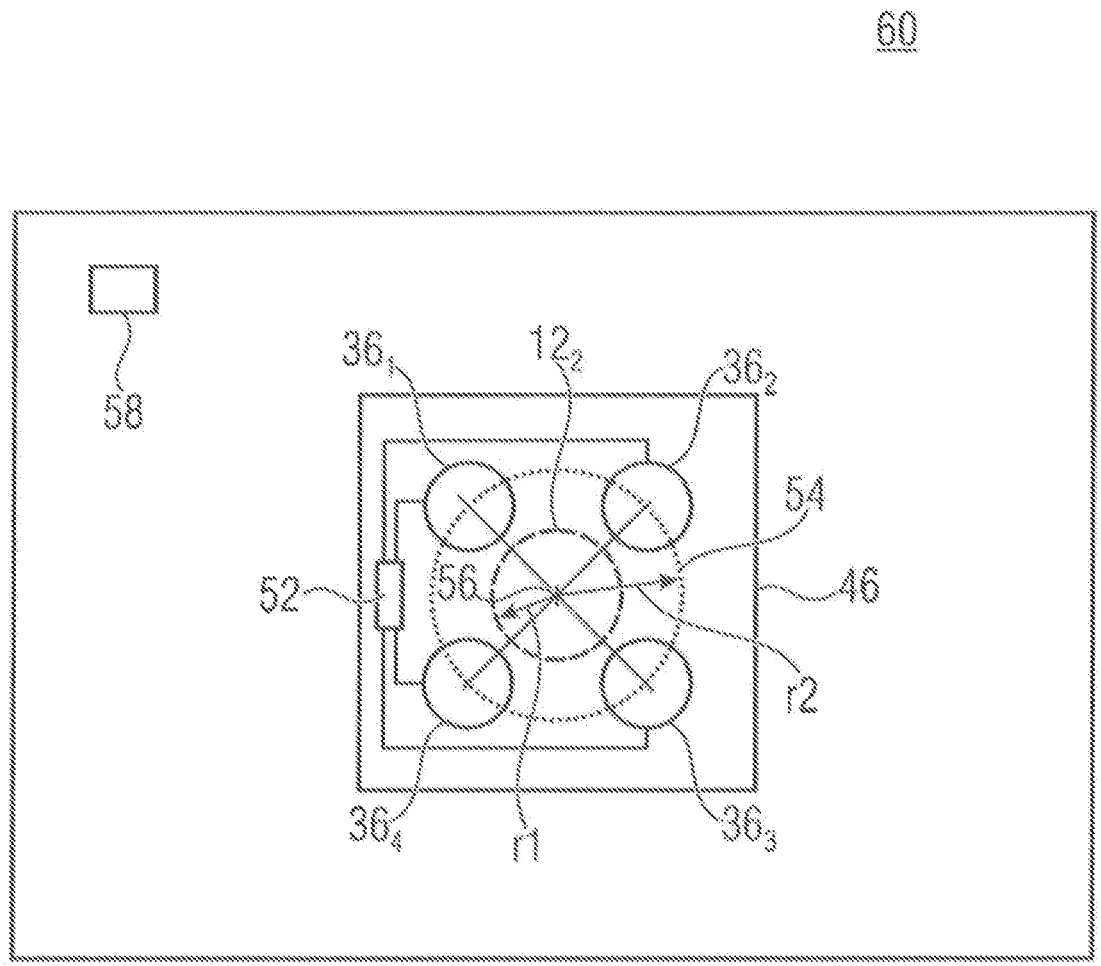
FIG. 6a shows a schematic plan view of an open or opened package according to one exemplary embodiment.

FIG. 6a shows a schematic plan view of an open or opened package 60 according to one exemplary embodiment. The package 60 comprises, by way of example, the four sensor elements $36_1$ to $36_4$ and an evaluation circuit 52 connected to the sensor elements. This means that the sensor elements $36_1$ to $36_4$ and the evaluation circuit 52 can form at least one part of a common package 60. Alternatively, the evaluation circuit 52 can also be used in other measurement arrangements without a package common to the sensor elements $36_1$ to $36_4$ being provided for this purpose. Although the package 60 is configured with four sensor elements $36_1$ to $36_4$, a number of three sensor elements is also already sufficient to form a difference in the sense of the gradiometric principle. Alternatively, a higher number of sensor elements may also be provided, for instance at least 5, at least 6, at least 7 or more. This enables a higher number of possible pairs of differences. The sensor elements 36 may be arranged on a circular path 54 at least within a tolerance range of ±10%, ±5% or ±2% based on local center points of the measurement sensitivity of the sensor elements 36.

The arrangement of the sensor elements $36_1$ to $36_4$ may have an area centroid 56 which may be arranged, for example, in a centered manner with respect to the axis of rotation 34 about which the soft magnetic element $12_1$ is arranged in a rotationally movable manner, for example.

An area centroid of the soft magnetic element $12_2$ may likewise be arranged on the axis of rotation. If the soft magnetic elements $12_1$ and $12_2$ are configured in a rotationally symmetrical manner, this makes it possible to influence the magnetic field in a constant and compensating manner. At this point, rotationally symmetrical means a rotational symmetry, in the case of which a rotation of the element by a particular angle results in a geometrical orientation of the element remaining unchanged. This can be understood as k-fold symmetry with 360°×n/k, where n is any desired integer. This applies to four positions in the case of a square and to eight positions in the case of an octagon, for example. The polygon can be increasingly changed to a circle with respect to higher positions to be measured.

Center points of the circular or annular soft magnetic elements $12_1$ and $12_2$ may be arranged on the same axis of rotation 34.

Figure 6B:
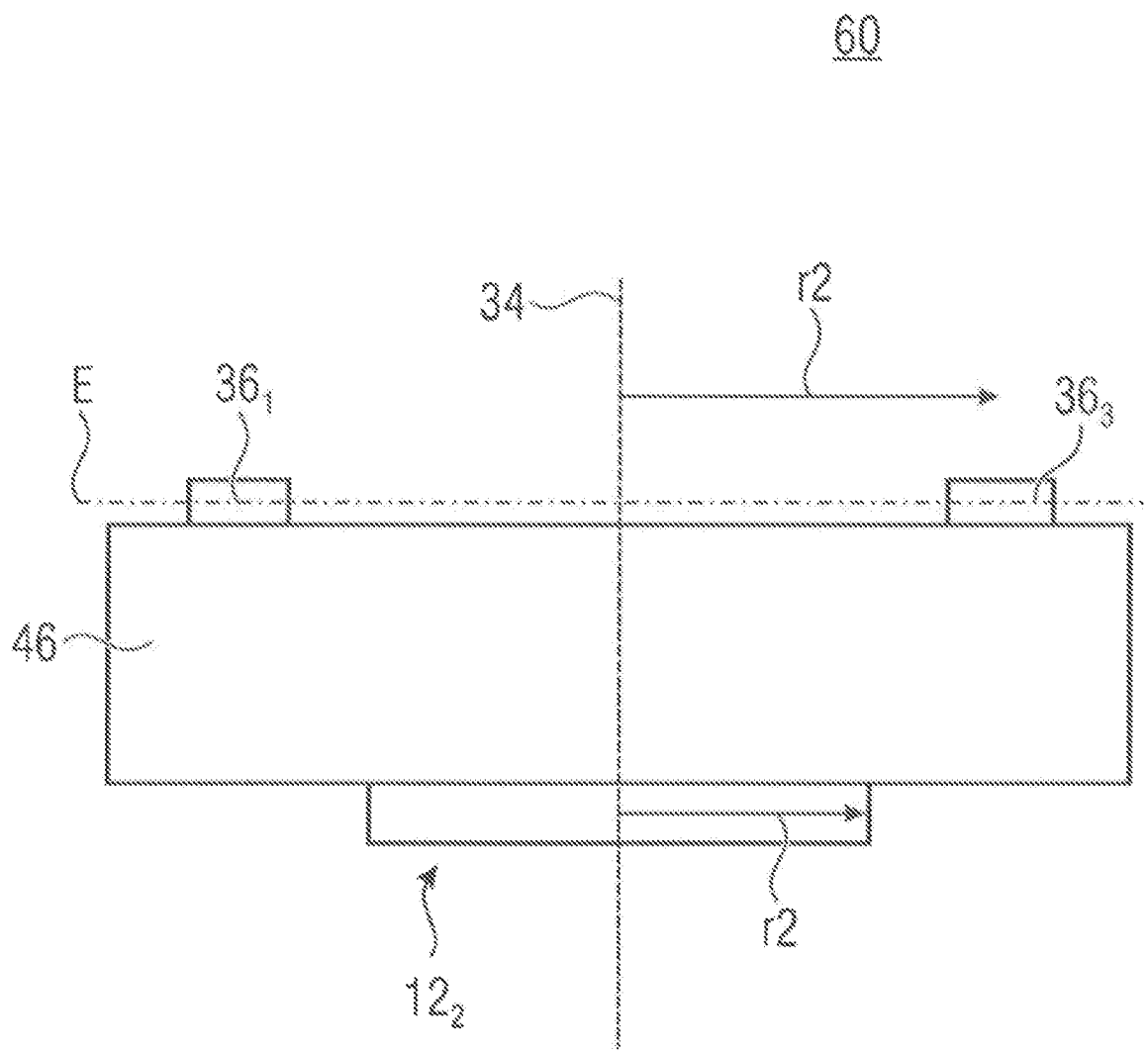

A radius $r_1$ of the soft magnetic element $12_2$ may be smaller than a radius $r_2$ of the circle 54 on which the sensor elements are arranged, which can be clearly seen in FIG. 6b which shows a schematic sectional side view of the package 60. The implementations of the package 60 can each also be implemented individually or in combination with other measurement arrangements described herein.

The package 60 may have a reference marking 58. The reference marking 58 may be configured in such a manner that its position on the package 60, for instance the housing, is uniquely assigned to a relative position of the axis of rotation 34. This means that the reference marking 58 can be used to precisely mount the package 60, with the result that the magnetic field can be precisely captured even if the sensor elements and/or the soft magnetic element $12_2$ cannot be seen with the naked eye.

According to exemplary embodiments, the sensor arrangement may have one or more groups of sensor elements. Each of these groups of sensor elements may be arranged in a rotationally symmetrical manner around an area of symmetry. For example, the sensor elements $36_1$ and $36_3$ may form a first group and the sensor elements $36_2$ and $36_4$ may form a second group. The area of symmetry may be, for example, the area centroid 56 within a certain tolerance range. The soft magnetic element $12_2$ may likewise be arranged in a rotationally symmetrical manner, to be precise about an element axis of symmetry. The element axis of symmetry may be arranged along a thickness direction of the element, for example in a circular disk of an axis which runs parallel to a surface normal of a cover surface of the cylinder and intersects the geometrical center point of this area. The area of symmetry around which the sensor elements are arranged can be arranged along the element axis of symmetry of the soft magnetic element $12_2$. With reference to FIG. 6b again, the element axis of symmetry may be congruent with the axis of rotation 34, for example, or may have only a deviation therefrom caused by manufacturing tolerances or mounting tolerances. This means that the area centroid 56 may be arranged on the axis of rotation 34.

It likewise becomes clear from considering the sensor elements $36_1$ to $36_4$ in groups that the different groups may be arranged, for example, at a different distance or radius with respect to the area centroid 56. The sensor elements $36_1$ and $36_3$ may be at a first distance, for example, and the sensor elements $36_2$ and $36_4$ may be at a distance which differs therefrom. By virtue of forming the difference in pairs between the sensor elements $36_1$ and $36_3$, on the one hand, and the sensor elements $36_2$ and $36_4$, on the other hand, the variation in distance within a group results at most in negligible influence of the measured value.

The soft magnetic elements $12_1$ and/or $12_2$ may be formed as layer structures each with at least one layer. This also includes multilayer embodiments, which also concomitantly includes different soft magnetic materials. It is also possible for one or more layers to be formed from a material other than a soft magnetic material, for example a combination of a soft magnetic layer with a dielectric layer or the like. The combination of different layers also makes it possible to use different soft magnetic materials with different soft magnetic properties.

Figure 7:
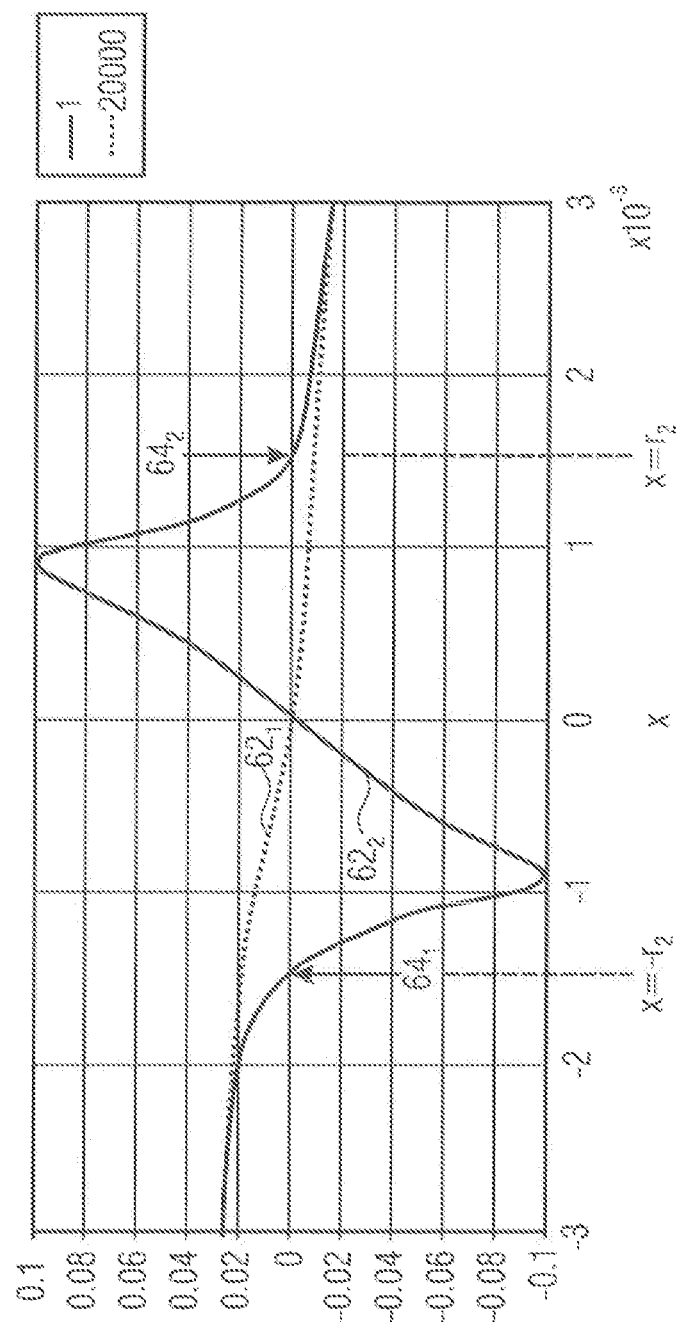
FIG. 7 shows an exemplary graph for illustrating the effect of exemplary embodiments on magnetic field profiles in the x direction.

FIG. 7 shows an exemplary graph for illustrating the effect of exemplary embodiments. A distance, for instance from the axis of rotation 34, is indicated on an abscissa. A vertical component of the magnetic field of the soft magnetic shaft magnetized by a diametric interference field is plotted on the ordinate. FIG. 7 shows a z component of the B field and therefore a Bz field or the magnetic flux density along z which can be produced by the shaft (soft magnetic element $12_1$) if it is magnetized in the diametric interference field of 0.1 T (=Bxdist) (with and without a lower soft magnetic counterpart $12_2$). The magnetic field of the permanent magnet is disregarded here, for example. In this case, represented numerical values are purely explanatory and do not restrict the exemplary embodiments. The graph shows, for example, an effect of a chip (sensor arrangement) having a thickness of 200 µm and a disk (soft magnetic element $12_2$) which has a thickness of 20 µm and has a diameter of 2 mm. A curve $62_1$ shows the influence $44_1$, that is to say the distortion of the magnetic field caused by the soft magnetic element $12_1$. Since the sensor elements $36_1$ to $36_4$ arranged in pairs must be arranged at a distance of greater than 0 from the axis of rotation when they are arranged in the same plane, it becomes clear therefrom that there is asymmetric influence which is not compensated for by forming a difference, but rather can result in measurement errors.

A curve 622 shows corresponding influence with the soft magnetic element $12_2$, that is to say an overall result. Even if influence can still occur, it is shown that regions $64_1$ and $64_2$, in which the interference effect is 0 or at least negligible, can be produced symmetrically around the axis of rotation 34. The radius $r_2$ can be determined therefrom since this is a good or ideal position for arranging the sensor elements.

In a system design, this means that high-quality tuning can be carried out on the basis of the following influencing parameters: soft magnetic element $12_1$, soft magnetic element $12_2$ (dimensions, relative permeability), distances with respect to one another and with respect to the sensor arrangement and location of the sensor elements.

In the graph illustrated, the shaft $12_1$ was assumed to have a diameter of 8 mm and a material with µr=1700 (steel) was implemented. The magnetic element 14 had a thickness of 2.5 mm and a diameter of 6 mm. The chip was designed with thickness of 200 µm and the Hall elements on the upper surface of the chip were 2.3 mm below the magnet. The reflective disk (soft magnetic element $12_2$) had a thickness of 20 µm, a diameter of 2 mm and a µr of $2\times10^4$. With a tolerance of ±0.5 mm with respect to the air gap, the interference field was able to be reduced at least by a factor of 3.5 at the Hall elements. In the interference field of 5 mT explained above, only a measurement error of 0.2° was determined.

In other words, curve $62_1$ shows the interference caused by the soft magnetic element $12_1$. The curve 622 is obtained with the disk (soft magnetic element $12_2$). The interference caused by the soft magnetic element $12_2$ is reduced in the region between x=1.4 mm and x=2.2 mm and is virtually 0 in the region of x=1.5 mm. This means that, for a reading radius ($r_2$) of 1.5 mm in this set up, the soft magnetic element $12_2$ can completely compensate for the lateral interference fields (at least at the specific distance from the shaft $12_1$).

FIG. 8 shows a schematic graph of the setup from FIG. 7, wherein the measured values are plotted along the y direction, that is to say perpendicular to the axis of rotation 34 and perpendicular to the x axis in FIG. 7. The remanence of the magnetic field in the y direction (that is to say the shaft 12ti is turned or rotated in such a manner that the magnetization of the magnet 14 points in the y direction) Bremy is 1.1 T, for example. The ordinate indicates the Bz field in Tesla, that is to say the z component of the magnetic flux density. The abscissa indicates the y position of the measurement point on the chip surface (x is assumed to be zero, for example). The two curves $62_3$ and $62_4$ show the magnetic field of the magnet on the chip, both times with the soft magnetic shaft $12_1$, but the curve is without a soft magnetic disk $12_2$ under the chip in $62_3$ and is with a soft magnetic disk $12_2$ in $62_4$. This can be seen, for example, at the edge of the disk having a diameter of 2 mm since, for y=+/−0.001 m, the curve $62_4$ has a strong excessive increase which can be explained by the fact that the field lines are focused in the lower disk.

In other words, a curve $62_3$ shows the setup while disregarding the soft magnetic element $12_2$, whereas the curve $62_4$, in a similar manner to the curve $62_2$, shows the overall result with the soft magnetic elements $12_1$ and $12_2$. It becomes clear that the soft magnetic element $12_2$ influences the useful field in the region of RR<0.9 (y component) and amplifies the field there by virtually a factor of 4, that is to say the useful field is even amplified at |y|<2 mm. For a value of y=1.5 mm, the useful field of the magnet is amplified only by approximately 13% (38.5 mT/34 mT). In this case too, represented numerical values are purely explanatory and do not restrict the exemplary embodiments. However, it becomes clear that the additional soft magnetic element $12_2$ under the chip or the sensor arrangement 22 does not adversely affect the useful field, but rather, on the contrary, even amplifies it to a slight extent, which can have a positive effect on the measurements.

In the setup in FIGS. 7 and 8, the distance between the magnet and the package (sensor device) is approximately 2 mm (4.8 mm-2.5 mm-0.3 mm). If the distance between the shaft $12_1$ and the sensor chip 22 changes, this can also slightly influence the influence of the disk $12_2$, as a result of which the efficiency can be adversely affected to a slight extent. Irrespective of this, in a distance range of ±0.5 mm with respect to the desired distance of 1.5 mm, for example, it is possible to achieve the situation in which that angle error remains well below 0.2 degrees in the case of interference fields of up to 5 mT. Exemplary embodiments relate to a gradiometric angle sensor. Exemplary embodiments relate to arrangements which address axial magnetic field components. Such a magnetic field can be produced by a permanent magnet, for example. The permanent magnet may be arranged, for example, on a rotationally mounted soft magnetic shaft. The sensor arrangement may have a flat substrate on which at least three magnetic field sensor elements spaced apart from one another are arranged. Furthermore, a circuit or an evaluation circuit may be provided in order to subtract the axial fields which act on the sensor elements. The described measurement arrangements can determine the rotational position of the shaft $12_1$ therefrom. Exemplary embodiments have a soft magnetic mirror structure (the soft magnetic element $12_2$) for this purpose which is arranged, for example, on that side of the flat substrate of the sensor arrangement which faces away from the shaft $12_1$.

The soft magnetic mirror structure $12_2$ may be formed as a layer structure having at least one layer and may have a permeability $\mu_r$ of >100, preferably >1000 or >10,000. Precise improvements can be achieved by arranging the center of gravity at the corresponding lateral position as the center point of the gradiometer or along the axis of rotation. The soft magnetic element $12_2$ may have a rotationally symmetrical shape. These include, for example, the shape of a disk, a ring and combinations of a plurality of disks and/or rings. A plurality of rings may also be arranged along the radial direction. An external diameter of the soft magnetic element $12_2$ may be greater than the maximum distance between two magnetic field sensor elements. The mirror structure $12_2$ may be arranged on the opposite side of the flat substrate to the magnetic field sensor elements.

Figure 9:
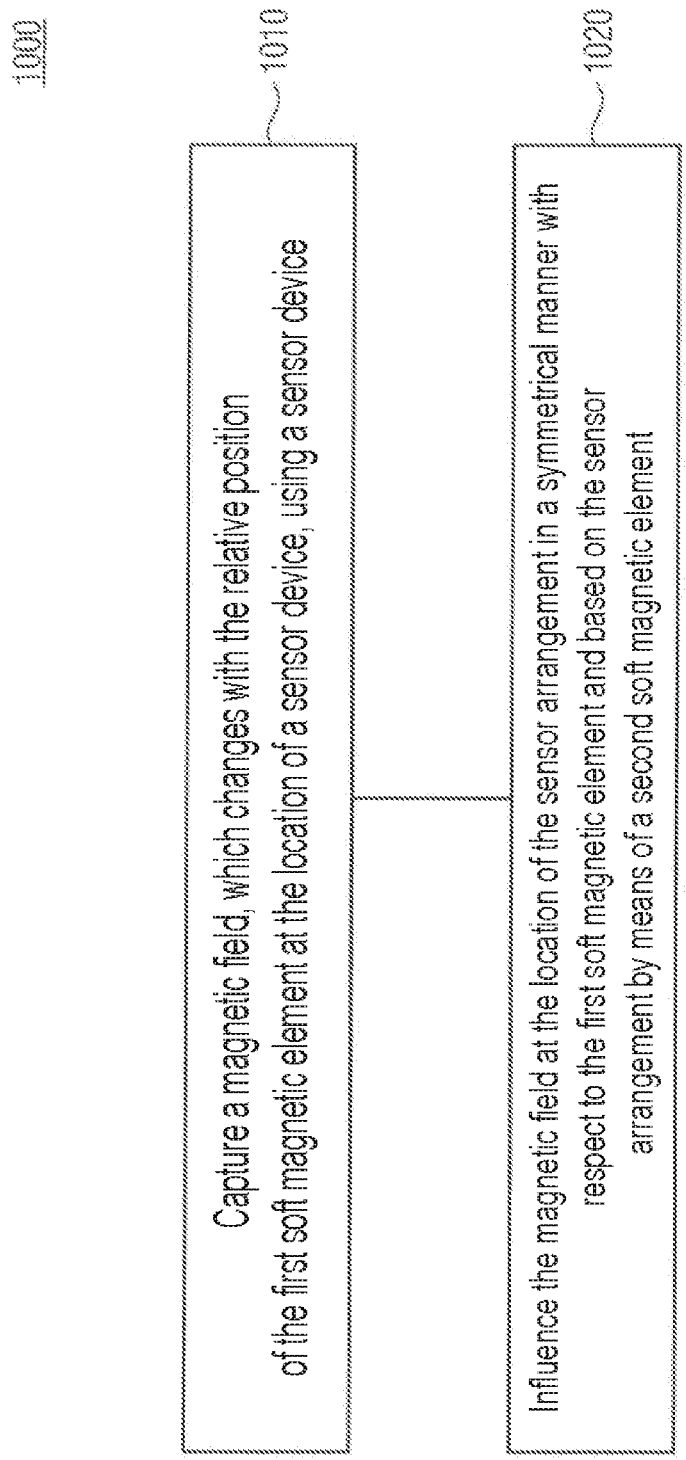
FIG. 9 shows a schematic flowchart of a method according to one exemplary embodiment which can be used to capture a relative position of a first soft magnetic element.

FIG. 9 shows a schematic flowchart of a method 1000 which can be used to capture a relative position of a first soft magnetic element, for instance the element $12_1$. In a step 1010, a magnetic field which changes with the relative position of the first soft magnetic element at the location of a sensor device is captured. The capture 1010 is effected using the sensor device. In a step 1020, the magnetic field is influenced at the location of the sensor arrangement in a manner symmetrical with respect to the first soft magnetic element and based on the sensor arrangement by means of a second soft magnetic element. Steps 1010 and 1020 can be carried out in any desired order and, in particular, at the same time.

Figure 10:
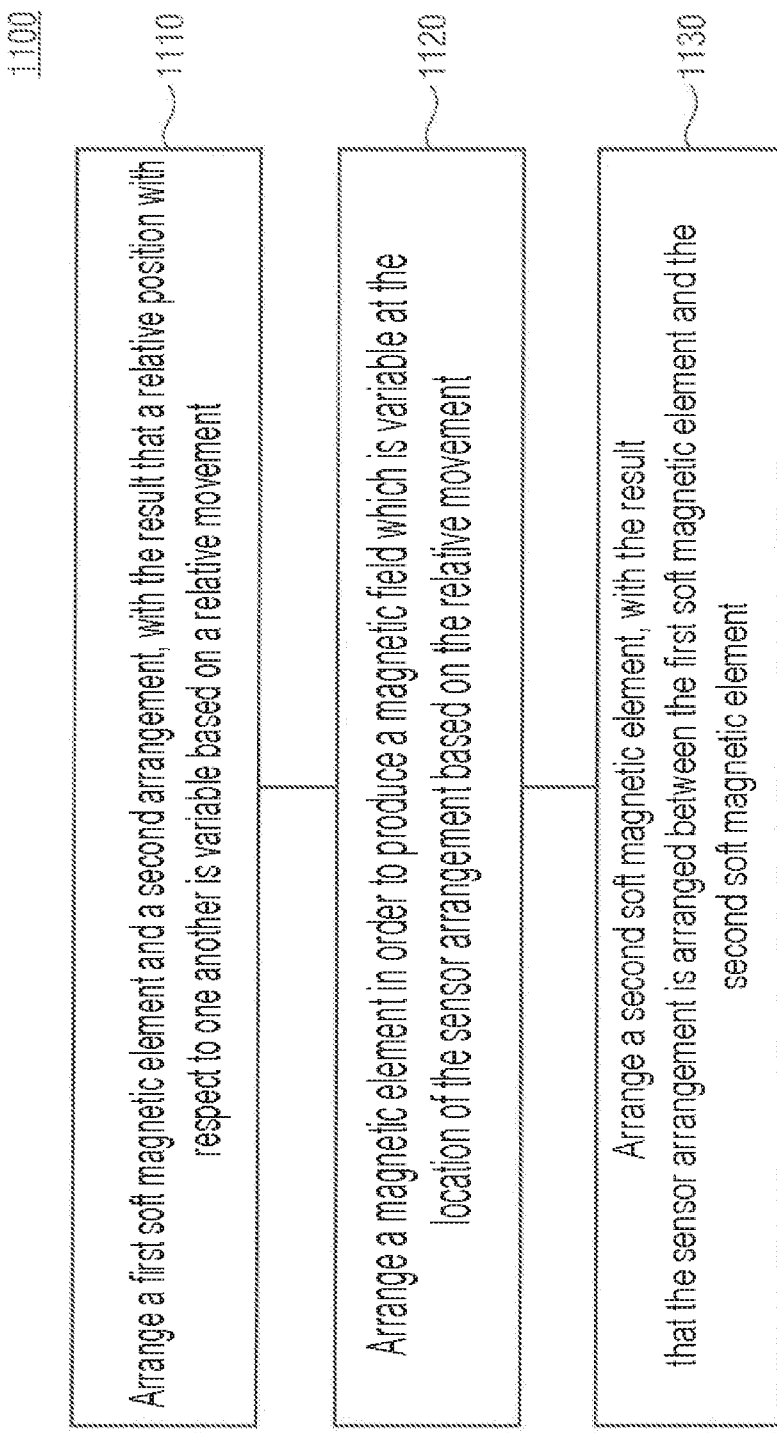
FIG. 10 shows a schematic flowchart of a method according to one exemplary embodiment which can be used, for example, to provide a measurement arrangement according to exemplary embodiments described herein.

FIG. 10 shows a schematic flowchart of a method 1100 according to one exemplary embodiment which can be used, for example, to provide a measurement arrangement according to exemplary embodiments described herein. In a step 1110, a first soft magnetic element ($12_1$) and a sensor arrangement are arranged, with the result that a relative position with respect to one another is variable based on a relative movement. In a step 1120, a magnetic element is arranged in order to produce a magnetic field which is variable at the location of the sensor arrangement based on the relative movement. In a step 1130, a second soft magnetic element ($12_2$) is arranged, with the result that the sensor arrangement and optionally the magnetic element are arranged between the first soft magnetic element and the second soft magnetic element.

Figure 11:
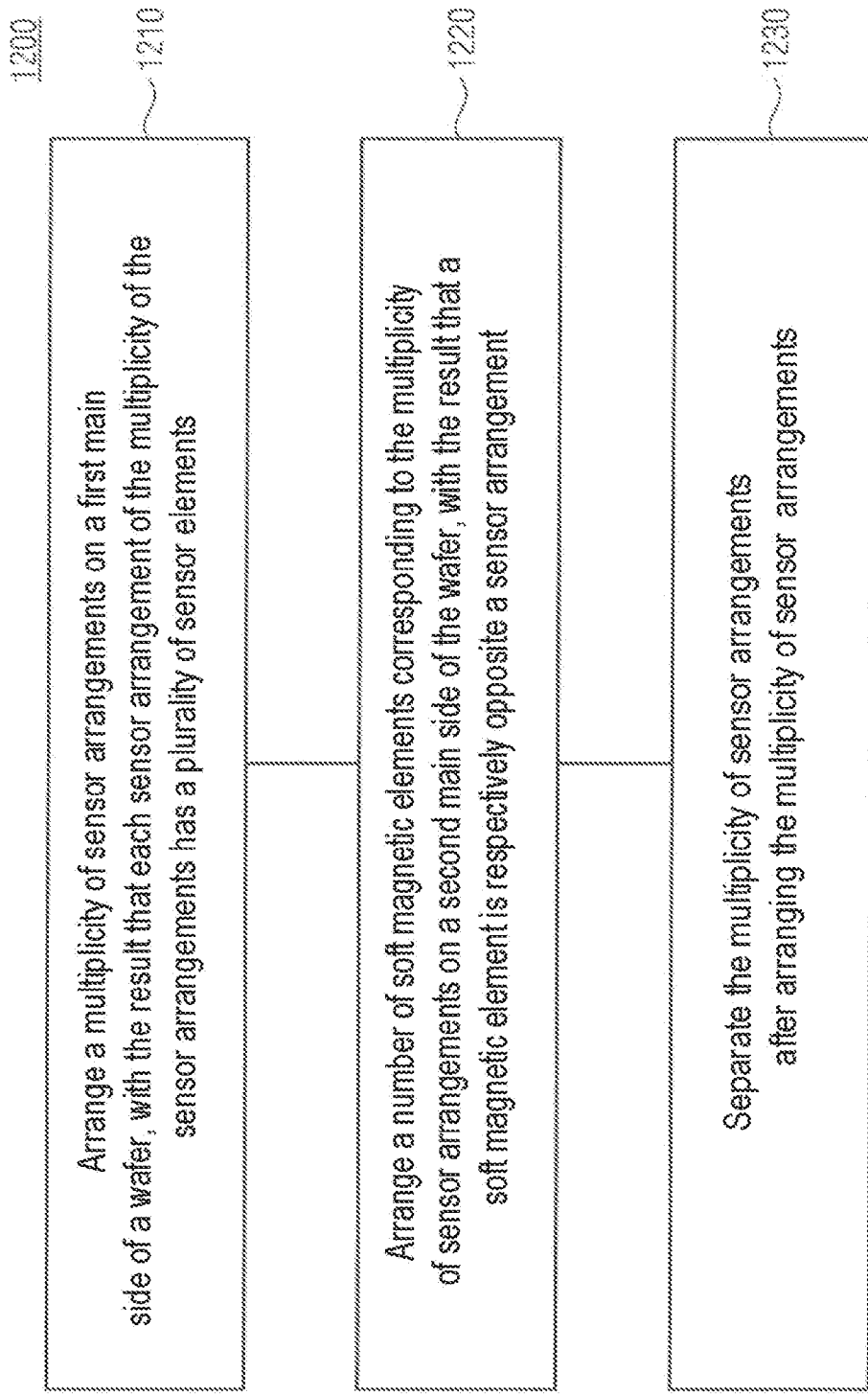
FIG. 11 shows a schematic flowchart of a method according to one exemplary embodiment which can be used to produce a sensor arrangement according to exemplary embodiments described herein, in particular in wafer-level manufacture.

FIG. 11 shows a schematic flowchart of a method 1200 which can be used to produce a sensor arrangement according to exemplary embodiments described herein, in particular at wafer level manufacture. In a step 1210, a multiplicity of sensor arrangements are arranged on a first main side of a wafer, with the result that each sensor arrangement of the multiplicity of sensor arrangements has a plurality of sensor elements. In a step 1220, a number of soft magnetic elements corresponding to the multiplicity of sensor arrangements is arranged on a second main side of the wafer, with the result that a soft magnetic element is respectively opposite a sensor arrangement. In a step 1230, the multiplicity of sensor arrangements are separated, wherein step 1230 is carried out after step 1210 and/or after step 1220.

Before separation, the sensor arrangements can be optionally tested, which makes it possible to capture the sensor arrangements and the respective effect of the soft magnetic elements already at wafer level.

In other words, exemplary embodiments can be configured in numerous embodiments. The disk (soft magnetic element $12_2$) can be arranged outside the sensor package or inside the sensor package. The disk may be fitted to the rear side of the sensor package, for instance by means of an adhesive, or the sensor package can be mounted on the top side of a main circuit board or component board or component plate, whereas the disk is fitted to the underside of the main circuit board. The disk may be fitted to the underside of the chip carrier, whereas the chip is mounted on the top side of the chip carrier of a package encapsulated by means of plastic. Exemplary embodiments provide for the disk to be arranged on the underside of the semiconductor chip which has the Hall plates on the other side. It goes without saying that terms such as top side or underside are used merely for clarity and do not restrict the exemplary embodiments.

Exemplary embodiments provide for the disk to be integrated in the sensor package and optionally for the disk to be fitted to the sensor chip itself. This makes it possible to place the disk on the rear side of the wafer. As a result of this method, for instance the method 1200, exemplary embodiments can be effected in a batch process/discontinuous process after the FE process on the silicon wafer. This can be carried out with high precision. The vertical distance between the disk and the Hall elements can be set well by means of processing processes such as etching processes or grinding processes. The material of the disk can be set well by the manufacturer and/or the process parameters, for instance with respect to the time during which solvents and/or atmospheres and/or temperature profiles are exposed during different steps, for instance curing, for instance in order to arrange the disk on the wafer and/or the chip on the chip carrier of the sensor package. These parameters can be set precisely.

The influence of the disk on the sensor can be tested and calibrated, for instance in an end-of-line test, which can also be carried out by the manufacturer, possibly also as a multi-temperature test with a plurality of tests. This is possible in a cost-efficient manner. The disk can be protected from environmental influences as an integral part of the sensor package. This enables protection against corrosion, moisture, chemicals and so on. This also enables a comparatively thin thickness of the disk, for example 20 µm. It is pointed out that the thickness may be dependent on the application and may be arbitrary in principle. The diameter and the arrangement in a plurality of layers or a plurality of rings, for example concentric rings, enable further degrees of freedom. In particular, this makes it possible to achieve the situation in which stray fields can be compensated for in a larger spatial area by magnetic field strengths, temperatures and distances. This can make it possible for the compensation effect of the soft magnetic element $12_2$ to be less sensitive to variations with respect to a distance between the soft magnetic element $12_1$ and the sensor or the diameter of the soft magnetic element $12_1$ or the magnetic field strength (which can partially saturate the soft magnetic element $12_2$) or temperature (which can result in a change in the $\mu_r$ of the soft magnetic element $12_2$ and can therefore influence the compensation effect).

The disk/ring may be arranged in a centered manner around the axis of rotation, that is to say in a centered manner with respect to the circle on which the Hall elements are arranged. The disk may be slightly smaller than the circle on which the Hall elements are arranged. Exemplary embodiments provide for the outer radius of the disk/ring+ the distance between the disk and the Hall plates to be approximately the same as the reading radius (which results from half the diameter of the circle on which the Hall elements are placed).

Exemplary embodiments also provide for the ring of the Hall plates and/or the disk/ring to be covered with nonmagnetic highly conductive disks/rings (for example made of aluminum or copper). This can be used to set the transient response of the soft magnetic element $12_2$ more like the transient response of the soft magnetic element $12_1$. In the soft magnetic element $12_1$, large circles of eddy currents may circulate and decrease with respect to the speed at which the shaft $12_1$ converts diametric interference magnetic fields into vertical magnetic fields, in particular in the region of the Hall plates.

Exemplary embodiments also provide for highly conductive regions to be provided in the soft magnetic element $12_2$ in order to implement a low-pass filter, that is to say in order to react comparatively slowly to fast interference.

For high-performance systems or less cost-sensitive products, provision may likewise be made for a plurality of disks/rings to be provided in a plurality of layers at a plurality of distances from the Hall elements. This may help to make the soft magnetic element $12_2$ robust with respect to changes in the distance between the soft magnetic element $12_1$ and the Hall elements.

Although some aspects have been described in connection with an apparatus, it goes without saying that these aspects are also a description of the corresponding method, with the result that a block or a component of an apparatus can also be understood as meaning a corresponding method step or a feature of a method step. In a similar manner, aspects which have been described in connection with a method step or as a method step are also a description of a corresponding block or detail or feature of a corresponding apparatus.

The exemplary embodiments described above are merely an illustration of the principles of the present invention. It goes without saying that modifications and variations of the arrangements described herein and details will be clear to other experts. Therefore, the intention is for the invention to be restricted only by the scope of protection of the following patent claims and not by the specific details which have been presented on the basis of the description and the explanation of the exemplary embodiments herein.

What is claimed is:

1. A measurement arrangement, comprising:
a rotatable shaft comprising a first soft magnetic element;
a second soft magnetic element;
a magnetic element that is mechanically coupled to the rotatable shaft and is configured to produce a magnetic field; and
a sensor arrangement configured to capture the magnetic field,
wherein the sensor arrangement is arranged in such a manner that a relative movement between the first soft magnetic element and the sensor arrangement results in a change in the magnetic field at a location of the sensor arrangement,
wherein the sensor arrangement is configured to determine the change in the magnetic field,
wherein the sensor arrangement is arranged between the first soft magnetic element and the second soft magnetic element, and
wherein the second soft magnetic element is configured to cause a distortion of an interference field caused by the first soft magnetic element and which is superimposed on the magnetic field, wherein the distortion caused by the second soft magnetic element is opposite a distortion of the interference field that is caused by the first soft magnetic element.

2. The measurement arrangement as claimed in claim 1, wherein the second soft magnetic element is configured to interact with the first soft magnetic element such that, when an external interference magnetic field which is diametrical based on the relative movement has an effect on the sensor arrangement, axial components of the external interference magnetic field are reduced with respect to the sensor arrangement by at least 30% in a nominal operating state.

3. The measurement arrangement as claimed in claim 1, wherein the relative movement comprises a relative rotational movement, and in which a second influence of the magnetic field caused by a soft magnetic property of the second soft magnetic element continues a first influence of the magnetic field caused by a soft magnetic property of the first soft magnetic element in a symmetrical manner with respect to the sensor arrangement along an axis of rotation of the relative rotational movement.

4. The measurement arrangement as claimed in claim 1, wherein the first soft magnetic element is rotationally mounted about an axis of rotation, wherein an area centroid of the second soft magnetic element is arranged on the axis of rotation.

5. The measurement arrangement as claimed in claim 1, wherein the relative movement comprises a relative rotational movement, and wherein the first soft magnetic element and the second soft magnetic element are formed in a rotationally symmetrical manner about an axis of rotation of the relative rotational movement.

6. The measurement arrangement as claimed in claim 1, wherein:
the relative movement comprises a relative rotational movement about an axis of rotation, and wherein the sensor arrangement has at least three sensor elements that are configured to capture the magnetic field,
the at least three sensor elements are arranged on a circular path having a first radius around a circle center arranged on the axis of rotation,
a main side of the second soft magnetic element facing the sensor arrangement is formed in a rotationally symmetrical manner about an axis of rotation of the relative rotational movement and has a second radius, and
the second radius is greater than the first radius.

7. The measurement arrangement as claimed in claim 1, wherein the sensor arrangement comprises a plurality of sensor elements formed as a magnetic angle sensor, wherein the sensor arrangement is configured to evaluate measurement signals generated by the plurality of sensor elements using a gradiometric principle.

8. The measurement arrangement as claimed in claim 1, wherein the second soft magnetic element is arranged at a shorter distance from the sensor arrangement than the first soft magnetic element, wherein a first diameter of the first soft magnetic element is greater than a second diameter of the second soft magnetic element.

9. The measurement arrangement as claimed in claim 1, wherein the sensor arrangement has a plurality of sensor elements, wherein each sensor element is configured to capture the magnetic field and to output a measurement signal based on the magnetic field, wherein the sensor arrangement further includes an evaluation circuit that is configured to receive the measurement signal output by each sensor element.

10. The measurement arrangement as claimed in claim 9, wherein the plurality of sensor elements are arranged on a first main side of a substrate and the second soft magnetic element is arranged on an opposite, second main side of the substrate.

11. The measurement arrangement as claimed in claim 9, wherein the plurality of sensor elements and the evaluation circuit form at least one part of a common package.

12. The measurement arrangement as claimed in claim 1, wherein the sensor arrangement and the second soft magnetic element form at least one part of a common package.

13. The measurement arrangement as claimed in claim 11, wherein the relative movement comprises a relative rotational movement, and wherein a housing of the common package has a reference marking that is configured to enable the common package to be mounted based on a relative position of an axis of rotation of the relative rotational movement.

14. The measurement arrangement as claimed in claim 1, wherein the sensor arrangement includes at least one group of sensor elements, wherein each group of sensor elements is arranged in a rotationally symmetrical manner around an area of symmetry, wherein the second soft magnetic element is formed in a rotationally symmetrical manner about an element axis of symmetry, wherein the area of symmetry is arranged along the element axis of symmetry.

15. The measurement arrangement as claimed in claim 1, wherein the relative movement comprises a relative rotational movement about an axis of rotation, and the sensor arrangement has a plurality of sensor elements, wherein the plurality of sensor elements are arranged on a plane perpendicular to the axis of rotation.

16. The measurement arrangement as claimed in claim 1, wherein the first soft magnetic element and the second soft magnetic element are at a constant distance with respect to one another and with respect to the sensor arrangement during the relative movement.

17. The measurement arrangement as claimed in claim 1, wherein at least one of the first soft magnetic element and the second soft magnetic element comprises a soft magnetic material having a relative permeability of at least 100.

18. The measurement arrangement as claimed in claim 1, wherein the second soft magnetic element comprises a layer structure comprising at least one layer.

19. The measurement arrangement as claimed in claim 18, wherein a first layer of the layer structure has a first soft magnetic material having a first magnetic property and a second layer of the layer structure has a second soft magnetic material having a second magnetic property different from the first magnetic property.

20. The measurement arrangement as claimed in claim 1, wherein the measurement arrangement is formed as a magnetic field gradiometer.

21. A method for capturing a relative position of a first soft magnetic element, the method comprising:
capturing a magnetic field, which changes with the relative position of the first soft magnetic element at a location of a sensor device, using the sensor device; and
influencing the magnetic field at the location of the sensor device in a symmetrical manner with respect to the first soft magnetic element and based on the sensor device utilizing a second soft magnetic element,
wherein the second soft magnetic element is configured to cause a distortion of an interference field caused by the first soft magnetic element and which is superimposed on the magnetic field, wherein the distortion caused by the second soft magnetic element is opposite a distortion of the interference field that is caused by the first soft magnetic element.

22. A method for providing a measurement arrangement, the method comprising:
arranging a first soft magnetic element and a sensor arrangement, with a result that a relative position with respect to one another is variable based on a relative movement;
arranging a magnetic element in order to produce a magnetic field that is variable at a location of the sensor arrangement based on the relative movement; and
arranging a second soft magnetic element, with a result that the sensor arrangement and the magnetic element are arranged between the first soft magnetic element and the second soft magnetic element,
wherein the second soft magnetic element is configured to cause a distortion of an interference field caused by the first soft magnetic element and which is superimposed on the magnetic field, wherein the distortion caused by the second soft magnetic element is opposite a distortion of the interference field that is caused by the first soft magnetic element.

23. A measurement arrangement, comprising:
a rotatable shaft comprising a first soft magnetic element;
a magnetic element that is mechanically coupled to the rotatable shaft and is configured to produce a magnetic field; and
a sensor arrangement configured to capture the magnetic field, wherein the sensor arrangement is arranged in such a manner that a relative movement between the first soft magnetic element and the sensor arrangement results in a change in the magnetic field at a location of the sensor arrangement, wherein the sensor arrangement is configured to determine the change in the magnetic field, and wherein a second soft magnetic element is configured to cause a distortion of an interference field caused by the first soft magnetic element, wherein the distortion caused by the second soft magnetic element is opposite a distortion of the interference field that is caused by the first soft magnetic element.

24. The measurement arrangement as claimed in claim 23, wherein the second soft magnetic element is configured to interact with the first soft magnetic element such that, when an external interference magnetic field which is diametrical based on the relative movement has an effect on the sensor arrangement, axial components of the external interference magnetic field are reduced with respect to the sensor arrangement by at least 30% in a nominal operating state.

25. The measurement arrangement as claimed in claim 23, wherein the relative movement comprises a relative rotational movement, and in which a second influence of the magnetic field caused by a soft magnetic property of the second soft magnetic element continues a first influence of the magnetic field caused by a soft magnetic property of the first soft magnetic element in a symmetrical manner with respect to the sensor arrangement along an axis of rotation of the relative rotational movement.

26. The measurement arrangement as claimed in claim 23, wherein the first soft magnetic element is rotationally mounted about an axis of rotation, wherein an area centroid of the second soft magnetic element is arranged on the axis of rotation.

* * * * *